US008807098B1

(12) United States Patent  
Louis

(10) Patent No.: US 8,807,098 B1  
(45) Date of Patent: Aug. 19, 2014

(54) TWIN VERTICAL BANK HYBRID INTERNAL COMBUSTION H-ENGINE SYSTEM

(71) Applicant: Herns Louis, Moreno Valley, CA (US)

(72) Inventor: Herns Louis, Moreno Valley, CA (US)

(*) Notice: Subject to any disclaimer, the term of this patent is extended or adjusted under 35 U.S.C. 154(b) by 112 days.

(21) Appl. No.: 13/713,474

(22) Filed: Dec. 13, 2012

Related U.S. Application Data

(60) Provisional application No. 61/656,234, filed on Jun. 6, 2012.

(51) Int. Cl.
| | |
|---|---|
| F02B 13/00 | (2006.01) |
| F02B 1/00 | (2006.01) |
| F02B 7/00 | (2006.01) |
| F02B 75/18 | (2006.01) |
| F02B 75/24 | (2006.01) |

(52) U.S. Cl.
CPC .................................... F02B 75/18 (2013.01)
USPC ....... 123/52.4; 123/52.5; 123/52.6; 123/53.2; 123/59.6; 123/575; 123/576; 123/577

(58) Field of Classification Search
CPC .................... F02D 2041/0012; F02D 41/0082; F02D 19/0655; F02D 19/0694; F02D 41/3076; B60K 5/08; B60K 6/24; B60K 6/26
USPC ....... 123/52.4, 52.5, DIG. 8, 52.6, 53.2, 59.6, 123/3, 575–578, 580
See application file for complete search history.

(56) References Cited

U.S. PATENT DOCUMENTS

| | | | |
|---|---|---|---|
| 4,394,854 A * | 7/1983 | Huber | 123/198 F |
| 4,638,637 A * | 1/1987 | Kronogard et al. | 60/718 |
| 5,228,423 A | 7/1993 | Oikawa et al. | |
| 5,771,860 A * | 6/1998 | Bernardi | 123/352 |
| 6,095,100 A | 8/2000 | Hughes | |
| 6,306,056 B1 | 10/2001 | Moore | |
| 6,508,223 B2 * | 1/2003 | Laimbock et al. | 123/195 P |
| 6,830,535 B2 * | 12/2004 | Wylin | 477/110 |
| 7,024,858 B2 * | 4/2006 | Gray Jr. | 60/709 |
| 7,032,385 B2 * | 4/2006 | Gray, Jr. | 60/716 |
| 7,416,510 B2 * | 8/2008 | Gebby | 477/2 |
| 7,533,639 B1 * | 5/2009 | Berger et al. | 123/59.6 |
| 8,091,521 B2 * | 1/2012 | Park | 123/70 R |
| 8,434,454 B2 * | 5/2013 | Park | 123/403 |
| 2002/0023599 A1 * | 2/2002 | Laimbock | 123/59.6 |
| 2004/0138026 A1 | 7/2004 | Carriere et al. | |
| 2010/0282219 A1 | 11/2010 | Alonso | |
| 2010/0326401 A1 | 12/2010 | Haugen et al. | |

* cited by examiner

*Primary Examiner* — Lindsay Low  
*Assistant Examiner* — Tea Holbrook  
(74) *Attorney, Agent, or Firm* — RG Patent Consulting, LLC; Rachel Gilboy

(57) ABSTRACT

A twin vertical bank hybrid internal combustion H-engine system; an assembly having an engine block with parallel left side and right side vertical inline piston banks, each having a crankshaft and pistons, a cylinder head, and individual fuel feeds operable on a first and second fuel type respectively. Each piston bank operates independently of the other but is housed within the same engine block and has separate lubrication systems. An operator selects which engine to run based on fuel availability, convenience, or lower cost of a certain fuel type. The chosen engine is mechanically or electrically selected via an engine bank selector box using a selector control which selects the fuel type and engages a drive gear on the crankshaft of the selected engine, and transfers power to the transmission. The selector control actuates a transfer system that prevents simultaneous operation of both engines.

12 Claims, 5 Drawing Sheets

TWIN VERTICAL BANK HYBRID INTERNAL COMBUSTION H-ENGINE SYSTEM

CROSS-REFERENCE TO RELATED APPLICATION

The present applications are related to and claims priority from prior provisional application Ser. No. 61/656,234, filed Jun. 6, 2012 which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of internal combustion engines, and more specifically relates to a twin vertical bank hybrid internal combustion H-engine system.

2. Description of the Related Art

The internal combustion engine vehicle has been the primary mode of transportation for at least 80 years, and has been widely available for use for at least 100 years. Petroleum fuels in the United States were very inexpensive until the gasoline shortage crisis of the 1970's, which marked the beginning of fuel price fluctuations and the gradual rise to the current level of fuel prices. The steep gasoline and diesel fuel prices have a domino effect that raises prices on nearly every sector of the economy and has led to renewed interest in the decrease or elimination of the dependence on fossil fuels. The use of hybrid vehicles using alternative fuels and energy sources is gaining in popularity, but the lack of infrastructure to support most hybrid vehicles is not in place, and won't be for some time. The electric vehicle is a strong contender to replace the internal combustion engine, but technology is still lacking to provide the speed and distance that modern vehicle drivers need. A second significant pitfall of the electric vehicle is the recharge time required to "fill up" enough potential energy to travel a practical distance.

In the attempt to solve the distance and recharge time problems, hybrid vehicle designs and engineering have been modernized as much as technology allows, but with that comes the large increases in initial vehicle costs and increases in maintenance costs. Repair shops are limited and recharging stations are even more limited. A simple engine design that is not cost prohibitive and that will allow users to take advantage of the cheapest of various types of fuels is needed.

Various attempts have been made to solve the above-mentioned problems such as those found in U.S. Pat. Nos. 6,095, 100; 2004/0138026; 2010/0282219; 2010/0326401; 6,306, 056; and 5,228,423. This prior art is representative of dual fuel engines. None of the above inventions and patents, taken either singly or in combination, is seen to describe the invention as claimed.

Ideally, a dual fuel (mode) engines should provide efficiency of operation and reduced operational costs, and yet, would operate reliably and be manufactured at a modest expense. Thus, a need exists for a reliable twin vertical bank hybrid internal combustion H-engine system to provide an efficient engine capable of alternating between two different fuel types, and to avoid the above-mentioned problems.

BRIEF SUMMARY OF THE INVENTION

In view of the foregoing disadvantages inherent in the known dual mode engine art, the present invention provides a novel twin vertical bank hybrid internal combustion H-engine system. The general purpose of the present invention, which will be described subsequently in greater detail, is to provide engine capable of alternating between two different fuel types.

Generally speaking, the twin vertical bank hybrid internal combustion H-engine system disclosed herein is basically two separate engines, each one operable on a different fuel type and housed within the same engine block, and each one having individual lubrication systems but sharing a common power transmission system. The operator may select which piston bank is to run based on fuel availability, convenience, or lower cost of a certain fuel type. The chosen engine is mechanically or electrically selected via an engine bank selector box using a selector control (means) which selects the fuel type and engages a drive gear on the crankshaft of the selected engine, and transfers power to the transmission. The selector control actuates a transfer system that prevents simultaneous operation of both engines. A twin vertical bank hybrid internal combustion H-engine system may comprise an engine assembly having an engine block, a left-side piston bank having a left-side crankshaft and having a first flywheel, at least one left-side piston, a left-side cylinder head, and a left-side fuel feed. The engine assembly further comprises a right-side piston bank having a right-side crankshaft with a second flywheel, at least one right-side piston, a right-side cylinder head, a right-side fuel feed, an engine bank selector box having a motor-engaging-end and a transmission-engaging-end, a drive gear, and a selector control.

The left-side piston bank and the right-side piston bank are integrated into the engine block and are vertically parallel to each other in preferred embodiments. The left-side and right-side piston banks are positioned such that a centerline for the left-side pistons and the right-side pistons are vertical. The left-side piston bank and the right-side piston bank are able to operate independently of each other. The left-side piston bank preferably comprises at least two left-side piston cylinders and the right-side piston bank preferably comprises at least two right-side piston cylinders (four of each in preferred embodiments).

The left-side crankshaft is centrally and longitudinally located below the left-side piston bank and the center axis of rotation of the left-side crankshaft is parallel to the top-side of the left-side piston bank (perpendicular to the bottom and top of the pistons). The at least one left-side piston is rotationally fastened to at least one left-side journal of the left-side crankshaft via a piston rod. The left-side cylinder head is sealably fastened to a top-side of the left-side piston bank so as to enclose the ignition volume within the cylinder. The left-side fuel feed distributes a first measured combustible air-fuel mixture into at least one left-side piston cylinder such that the first measured combustible air-fuel mixture is compressed and explosion-ignited to rotationally drive the left-side piston bank. The first measured combustible air-fuel mixture is preferably gasoline.

The left-side flywheel and the right-side flywheel (or other suitable equivalent) permit balancing of the left-side crankshaft and the right-side crankshaft respectively. The first flywheel and the second flywheel may be offset, preferably such that a forward and a reverse sliding gear may engage either a left-side crankshaft or a right side crankshaft to the transmission. The right-side crankshaft is centrally and longitudinally located below the right-side piston bank and a center axis of rotation of the right-side crankshaft is parallel to the upper-side of the right-side piston bank. The at least one right-side piston is rotationally fastened to at least one right-side journal of the right-side crankshaft. The right-side cylinder head is sealably fastened to an upper-side of the right-side piston bank. The right-side fuel feed distributes a second measured combustible air-fuel mixture into at least one right-side piston cylinder such that the second measured combustible air-fuel mixture is compressed and explosion-ignited to rotationally drive the right-side crankshaft. The second measured combustible air-fuel mixture preferably comprises natural gas.

The vehicle further comprises an activator to change a mode from using the first measured combustible air-fuel mixture to the second measured combustible air-fuel mixture and the activator is able to change from using the second measured combustible air-fuel mixture back to the first measured combustible air-fuel mixture. The motor-engaging-end of the engine bank selector box is coupled to a back side of the engine block such that a user is able to select a left-side piston bank and alternately a right-side piston bank, via the selector control, to power a drive train. The selector control is able to slideably direct-engage the first flywheel to the input shaft of the transmission. Other gearing, balancing, power transmission means and the like may be employed.

Each individually and selectively operational left-side piston bank or right-side piston bank is able to be coupled to exactly one transmission having exactly one input shaft. The input shaft may comprise a spline or other suitable equivalent. The selector control is able to slideably direct-engage the second flywheel to the input shaft of the transmission, and the engine assembly is usable by the user to selectively and rotationally drive the drive train of a vehicle using the left-side piston bank with the first measured combustible air-fuel mixture, and to selectively and alternately rotationally drive the drive train of the vehicle using the right-side piston bank with the second measured combustible air-fuel mixture, such that the user is able to reduce an operation cost of the vehicle by selecting an available and a lower cost fuel type.

A method of use for a twin vertical bank hybrid internal combustion H-engine system may comprise the steps of: inserting an ignition key into an ignition switch, turning the switch to an on position, selecting a user preferred fuel type and piston bank for use via a selector control, starting a vehicle engine assembly, using the vehicle, parking the vehicle, and turning the ignition switch to an off position.

The present invention holds significant improvements and serves as a twin vertical bank hybrid internal combustion H-engine system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, twin vertical bank hybrid internal combustion H-engine system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a dual mode engine system and more particularly to a twin vertical bank hybrid internal combustion H-engine system as used to improve the ability of a user to choose between two different fuel types to take advantage of whichever one has lower fuel prices.

In general terms, a twin vertical bank hybrid internal combustion H-engine system is basically two separate engines, each operable on a different fuel type, but housed within the same engine block and having separate lubrication systems (as the burning of the different fuels will cause the oil(s) to be contaminated at different amounts over a duration). The operator selects which engine to run based on fuel availability, convenience, or lower cost of a certain fuel type. The chosen engine is mechanically or electrically selected via an engine bank selector box using a selector control which selects the fuel type and engages a drive gear on the crankshaft of the selected engine, thereby transferring power to the transmission and drive train. The selector control actuates a transfer system that prevents simultaneous operation of both engines.

Figure 1:
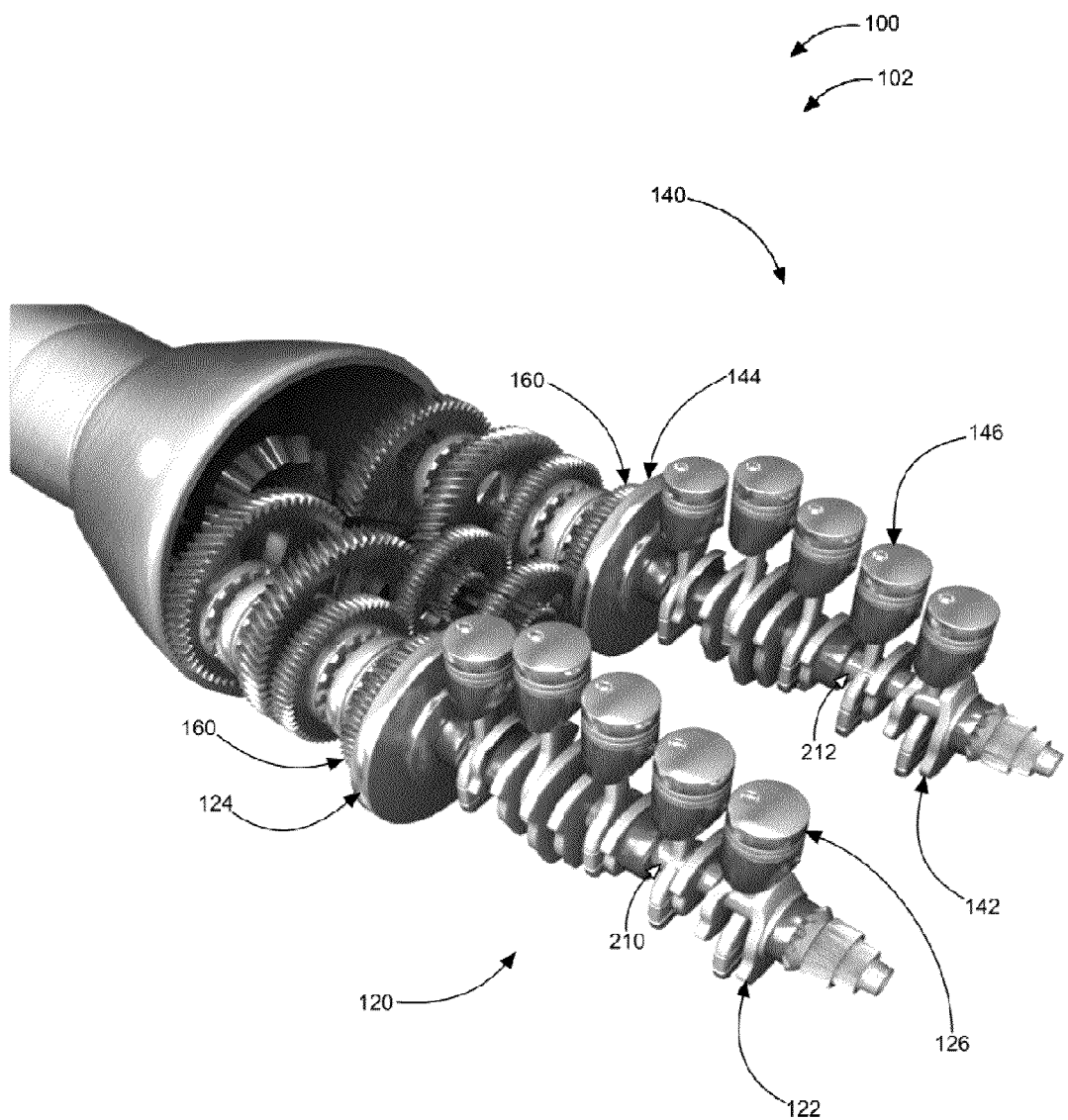
FIG. 1 shows a perspective view illustrating an internal component layout of a twin vertical bank hybrid internal combustion H-engine system according to an embodiment of the present invention.

In greater detail now, referring to the drawings by numerals of reference there is shown in FIG. 1, a perspective view illustrating the internal component layout of twin vertical bank hybrid internal combustion H-engine system 100 according to an embodiment of the present invention.

Twin vertical bank hybrid internal combustion H-engine system 100 may comprise engine assembly 102 having engine block 110, left-side piston bank 120 having left-side crankshaft 122 and having first flywheel 124, at least one left-side piston 126, left-side cylinder head 128, and left-side fuel feed 130. Engine assembly 102 further comprises right-side piston bank 140 having right-side crankshaft 142 having second flywheel 144, at least one right-side piston 146, right-side cylinder head 148, right-side fuel feed 152, and engine bank selector box 150 having motor-engaging-end 154, transmission-engaging-end 158, drive gear 160, and selector control 170.

Left-side piston bank 120 and right-side piston bank 140 are integrated into engine block 110 and are vertically parallel to each other. Left-side piston bank 120 and right-side piston bank 140 are positioned such that centerline 180 for at least one left-side piston 126 and at least one right-side piston 146 are vertical. Left-side piston bank 120 and right-side piston bank 140 are able to operate independently of each other such that one may work without the other. Left-side piston bank 120 preferably comprises at least two left-side piston cylinder(s) 190 and right-side piston bank 140 preferably comprises at least two right-side piston cylinder(s) 199. Left-side crankshaft 122 is centrally and longitudinally located below left-side piston bank 120 and center axis of rotation of left-side crankshaft 122 is parallel to top-side 200 of left-side piston bank 120. At least one left-side piston 126 is rotationally fastened to at least one left-side journal 210 of left-side crankshaft 122 via at least one piston rod 220. Left-side cylinder head 128 is sealably fastened to top-side 200 of left-side piston bank 120.

Figure 2:
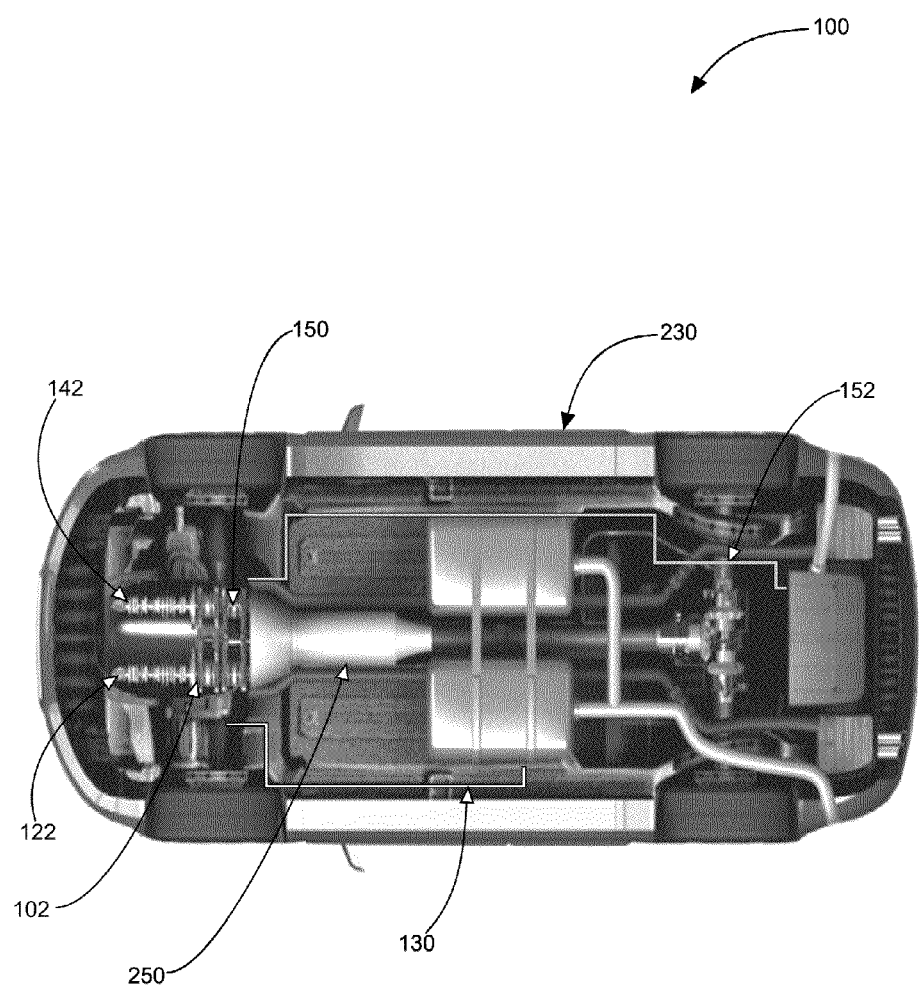
FIG. 2 is a perspective view illustrating an underside view of a vehicle having the twin vertical bank hybrid internal combustion H-engine system according to an embodiment of the present invention of FIG. 1.

Referring now to FIG. 2, a perspective view illustrating an underside view of vehicle 230 having twin vertical bank hybrid internal combustion H-engine system 100 according to an embodiment of the present invention of FIG. 1.

Left-side fuel feed distributes a first measured combustible air-fuel mixture into at least one left-side piston cylinder(s) 190 such that the first measured combustible air-fuel mixture is compressed and explosion-ignited to rotationally drive left-side piston bank 120. The first measured combustible air-fuel mixture is preferably gasoline. Right-side fuel feed 152 distributes a second measured combustible air-fuel mixture into at least one right-side piston cylinder(s) 199 such that the second measured combustible air-fuel mixture is compressed and explosion-ignited (or non-explosion-ignited on for example diesel versions) to rotationally drive right-side crankshaft 142. The second measured combustible air-fuel mixture preferably comprises natural gas. Vehicle 230 comprises an activator 240 to change a mode from using the first measured combustible air-fuel mixture to the second measured combustible air-fuel mixture and activator 240 is able to change from using the second measured combustible air-fuel mixture back to the first measured combustible air-fuel mixture. In this way the user can conveniently select between fuels as desired.

Figure 3A:
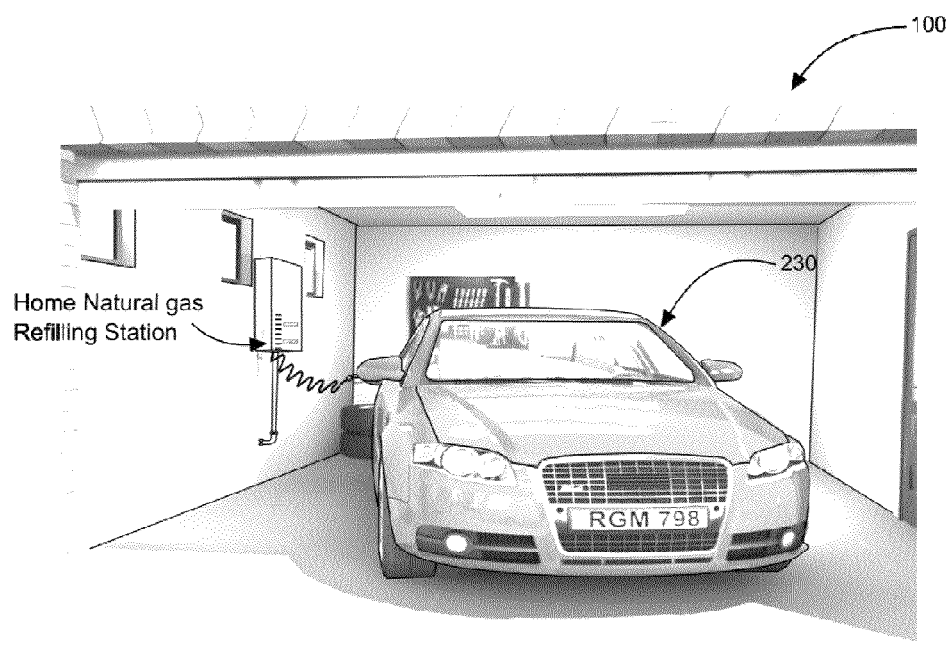
FIG. 3A is a perspective view illustrating a twin vertical bank hybrid internal combustion H-engine system powered vehicle being refueled with natural gas at a home fill site according to an embodiment of the present invention of FIGS. 1 and 2.
Figure 3B:
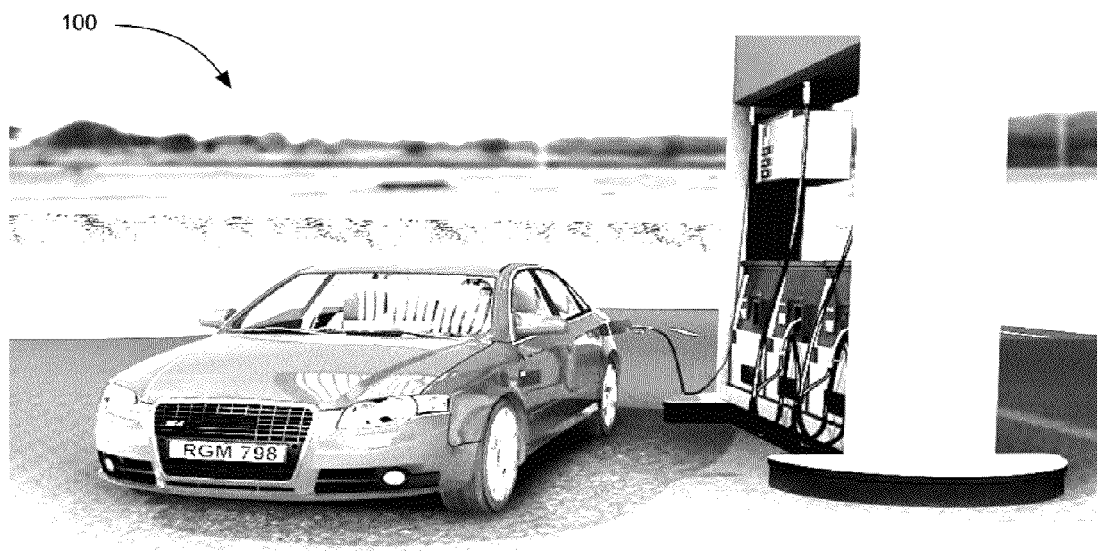
FIG. 3B is a perspective view illustrating a twin vertical bank hybrid internal combustion H-engine system powered vehicle being refueled at a fuel station according to an embodiment of the present invention of FIGS. 1 and 2.

Referring now to FIGS. 3A and 3B, perspective views illustrating twin vertical bank hybrid internal combustion H-engine system 100 vehicle 230 being refueled with natural gas at a home (filling station) or in FIG. 3B at a service station both according to an embodiment of the present invention of FIG. 1.

Each (individually and selectively operational) left-side piston bank 120 or right-side piston bank 140 is able to be coupled to exactly one transmission 250 having exactly one input shaft via engine bank selector box 150. The input shaft may comprise a spline. Other means for coupling to the input shaft may be used. The selector control 170 is able to slideably direct-engage the second flywheel 144 to the input shaft of transmission 250, and engine assembly 102 is thereby usable by the user to selectively and rotationally drive the drive train of vehicle 230 using left-side piston bank 120 with the first measured combustible air-fuel mixture, and to selectively and alternately rotationally drive the drive train of vehicle 230 using right-side piston bank 140 with the second measured combustible air-fuel mixture. In this way the user is able to reduce an operational cost of vehicle 230 by selecting an available and a lower cost fuel type.

Figure 4A:
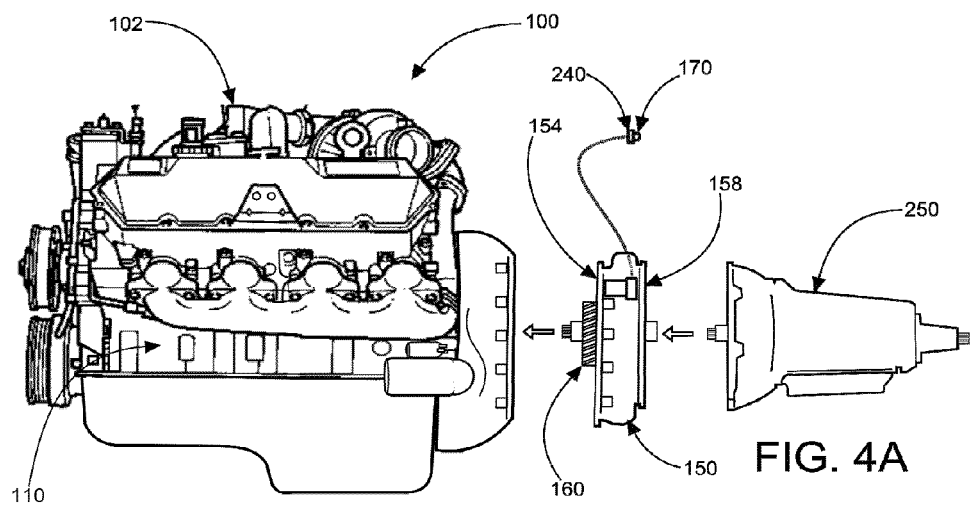
FIG. 4A and FIG. 4B, illustrating a right side profile view and a front view, respectively, of an engine assembly, engine bank selector box, and transmission of twin vertical bank hybrid internal combustion H-engine system according to an embodiment of the present invention of FIG. 1.
Figure 4B:
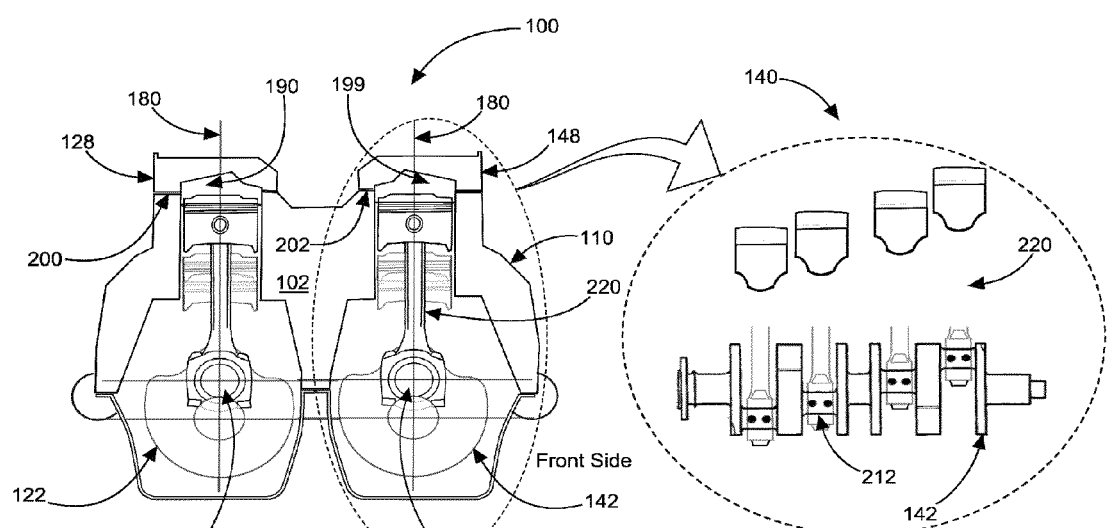
Figure 4B:
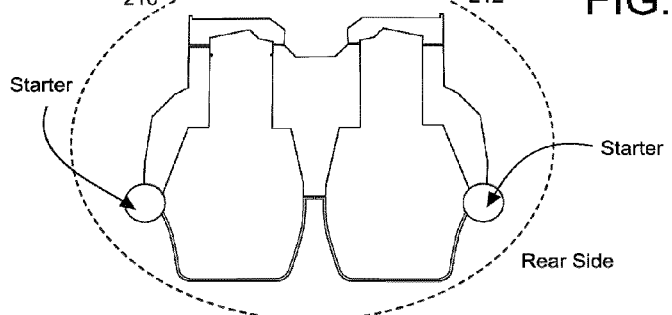

Referring now to FIG. 4A and FIG. 4B, illustrating a right side profile view and a front view respectively of engine assembly 102, engine bank selector box 150, and transmission 250 of twin vertical bank hybrid internal combustion H-engine system 100 according to an embodiment of the present invention of FIG. 1.

First flywheel 124 and second flywheel 144 permit balancing of left-side crankshaft 122 and right-side crankshaft 142, respectively. First flywheel 124 and second flywheel 144 may be offset, preferably such that a forward and reverse sliding gear may either engage left-side crankshaft 122 or right-side crankshaft 142 to transmission 250. Right-side crankshaft 142 is centrally and longitudinally located below right-side piston bank 140 and center axis of rotation of right-side crankshaft 142 is parallel to upper-side 202 of right-side piston bank 140. At least one right-side piston 146 is rotationally fastened to at least one right-side journal 212 of right-side crankshaft 142. Right-side cylinder head 148 is sealably fastened to an upper-side 202 of right-side piston bank 140. Motor-engaging-end 154 of engine bank selector box 150 is coupled to back side of engine block 110 such that user is able to select left-side piston bank 120 and alternately right-side piston bank 140, via selector control 170, to power the drive train. Selector control 170 is able to slideably direct-engage first flywheel 124 to the input shaft of transmission 250.

Twin vertical bank hybrid internal combustion H-engine system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different piston combinations, parts may be sold separately, etc., may be sufficient. Other components are not mentioned (for example valves, fuel storage tanks, fuel distribution lines, pumps, etc.) are not mentioned as they are considered to be known in the art and also since many different combinations are available. The present disclosure serves to provide sufficient enabling means; however the embodiments provided are for exemplary means and are not intended to be limiting in any way.

Figure 5:
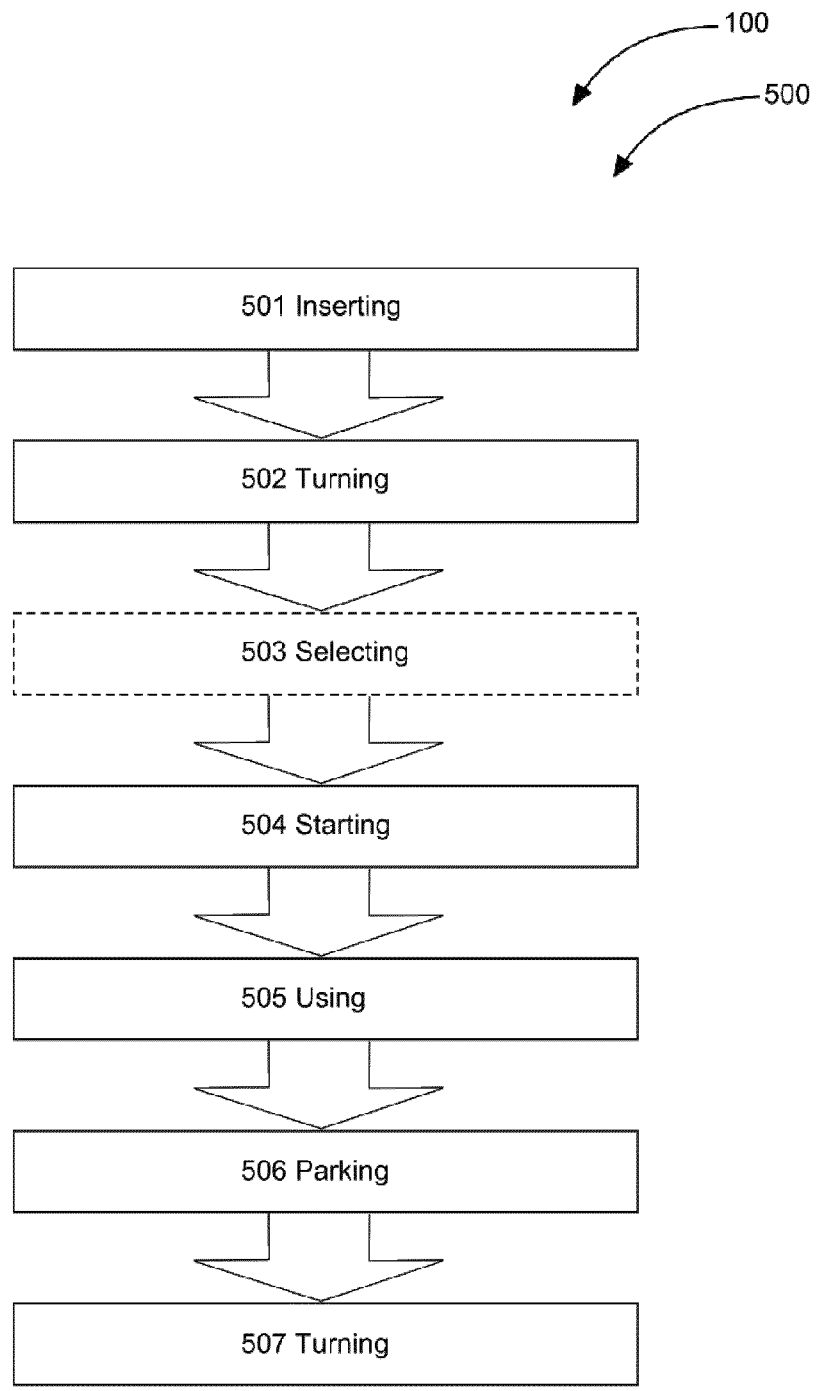
FIG. 5 is a flowchart illustrating a method of use of the twin vertical bank hybrid internal combustion H-engine system according to an embodiment of the present invention of FIGS. 1-4.

Referring now to FIG. 5, showing a flowchart illustrating method of use 500 for a twin vertical bank hybrid internal combustion H-engine system 100 according to an embodiment of the present invention of FIGS. 1-4.

Method of use 500 for twin vertical bank hybrid internal combustion H-engine system 100 may comprise the steps of: step one 501 inserting an ignition key into an ignition switch (or other suitable equivalent activation means); step two 502 turning the switch to an on position; step three 503 selecting a user preferred fuel type and piston bank for use via a selector control 170; step four 504 starting vehicle 230 engine assembly 102; step five 505 using vehicle 230; step six 506 parking vehicle 230; and step seven 507 turning the ignition switch to an off position.

It should be noted that step 503 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A twin vertical bank hybrid internal combustion H-engine system comprising: an engine assembly having:
   an engine block;
   a left-side piston bank having:
      a left-side crankshaft having a first flywheel;
      at least one left-side piston;
      a left-side cylinder head; and
      a left-side fuel feed;
   a right-side piston bank having:
      a right-side crankshaft having a second flywheel;
      at least one right-side piston;
      a right-side cylinder head; and
      a right-side fuel feed;
   an engine bank selector box having:
      a motor-engaging-end;
      a transmission-engaging-end;
      a drive gear; and
      a selector control;
   wherein said left-side piston bank and said right-side piston bank are integrated into said engine block;
   wherein said left-side piston bank and said right-side piston bank are vertically parallel to each other;
   wherein said left-side piston bank and said right-side piston bank are able to operate independently of each other;
   wherein said left-side crankshaft is centrally and longitudinally located below said left-side piston bank;
   wherein said at least one left-side piston is rotationally fastened to at least one left-side journal of said left-side crankshaft;
   wherein said left-side cylinder head is sealably fastened to a top-side of said left-side piston bank;
   wherein said left-side fuel feed distributes a first measured combustible air-fuel mixture into at least one left-side piston cylinder such that said first measured combustible air-fuel mixture is compressed and explosion-ignited to rotationally drive said left-side crankshaft;
   wherein said right-side crankshaft is centrally and longitudinally located below said right-side piston bank;
   wherein said at least one right-side piston is rotationally fastened to at least one right-side journal of said right-side crankshaft;
   wherein said right-side cylinder head is sealably fastened to an upper-side of said right-side piston bank;
   wherein said right-side fuel feed distributes a second measured combustible air-fuel mixture into at least one right-side piston cylinder such that said second measured combustible air-fuel mixture is compressed and explosion-ignited to rotationally drive said right-side crankshaft;
   wherein said a motor-engaging-end of said engine bank selector box is coupled to a back side of said engine block such that a user is able to select a left-side piston bank and alternately a right-side piston bank, via said selector control, to power a drive train; and
   wherein said engine assembly is usable by said user to selectively and rotationally drive said drive train of a vehicle using said left-side piston bank with said first measured combustible air-fuel mixture, and to selectively and alternately rotationally drive said drive train of said vehicle using said right-side piston bank with said second measured combustible air-fuel mixture, such that said user is able to reduce an operation cost of said vehicle by selecting an available and a lower cost fuel type;
   wherein said first measured combustible air-fuel mixture is gasoline; and
   wherein said second measured combustible air-fuel mixture comprises natural gas.

2. The twin vertical bank hybrid internal combustion H-engine system of claim 1, wherein said left-side piston bank and said right-side piston bank are positioned such that a centerline for said at least one left-side piston and at least one said right-side piston are vertical.

3. The twin vertical bank hybrid internal combustion H-engine system of claim 1 wherein said left-side piston bank comprises at least two said left-side piston cylinders.

4. The twin vertical bank hybrid internal combustion H-engine system of claim 1 wherein said right-side piston bank comprises at least two said right-side piston cylinders.

5. The twin vertical bank hybrid internal combustion H-engine system of claim 1 wherein said left-side fly wheel and said right-side fly wheel permit balancing of said left-side crankshaft and said right-side crankshaft respectively.

6. The twin vertical bank hybrid internal combustion H-engine system of claim 1 wherein said first flywheel and said second flywheel are offset.

7. The twin vertical bank hybrid internal combustion H-engine system of claim 1 wherein said right-side piston bank is at a non-V orientation to said left-side piston bank.

8. The twin vertical bank hybrid internal combustion H-engine system of claim 1 wherein a center axis of rotation of said right-side crankshaft is parallel to said upper-side of said right-side piston bank.

9. The twin vertical bank hybrid internal combustion H-engine system of claim 1 wherein said a center axis of rotation of said left-side crankshaft is parallel to said top-side of said left-side piston bank.

10. The twin vertical bank hybrid internal combustion H-engine system of claim 1 wherein said vehicle comprises an activator to change a mode from using said first measured combustible air-fuel mixture to said second measured combustible air-fuel mixture.

11. The twin vertical bank hybrid internal combustion H-engine system of claim 10 wherein said activator is able to change from using said second measured combustible air-fuel mixture back to said first measured combustible air-fuel mixture.

12. A twin vertical bank hybrid internal combustion H-engine system comprising: an engine assembly having:
    an engine block;
    a left-side piston bank having:
        a left-side crankshaft having a first flywheel;
        at least one left-side piston;
        a left-side cylinder head; and
        a left-side fuel feed;
    a right-side piston bank having:
        a right-side crankshaft having a second flywheel;
        at least one right-side piston;
        a right-side cylinder head; and
        a right-side fuel feed;
    an engine bank selector box having:
        a motor-engaging-end;
        a transmission-engaging-end;
        a drive gear; and
        a selector control;
        wherein said left-side piston bank and said right-side piston bank are integrated into said engine block;
        wherein said left-side piston bank and said right-side piston bank are vertically parallel to each other;
        wherein said left-side piston bank and said right-side piston bank are positioned such that a centerline for said a least one left-side piston and at least one said right-side piston are vertical;
        wherein said left-side piston bank and said right-side piston bank are able to operate independently of each other;
        wherein said left-side piston bank comprises at least two said left-side piston cylinders;
        wherein said right-side piston bank comprises at least two said right-side piston cylinders;
        wherein said left-side crankshaft is centrally and longitudinally located below said left-side piston bank;
        wherein said at least one left-side piston is rotationally fastened to at least one left-side journal of said left-side crankshaft;
        wherein said left-side cylinder head is sealably fastened to a top-side of said left-side piston bank;
        wherein said left-side fuel feed distributes a first measured combustible air-fuel mixture into at least one left-side piston cylinder such that said first measured combustible air-fuel mixture is compressed and explosion-ignited to rotationally drive said left-side crankshaft;
        wherein said first measured combustible air-fuel mixture is gasoline;
        wherein said right-side crankshaft is centrally and longitudinally located below said right-side piston bank;
        wherein said left-side fly wheel and said right-side fly wheel permit balancing of said left-side crankshaft and said right-side crankshaft respectively;
        wherein said first flywheel and said second flywheel are offset;
        wherein a center axis of rotation of said right-side crankshaft is parallel to said upper-side of said right-side piston bank;
        wherein said center axis of rotation of said left-side crankshaft is parallel to said top-side of said left-side piston bank;
        wherein said at least one right-side piston is rotationally fastened to at least one right-side journal of said right-side crankshaft;
        wherein said right-side cylinder head is sealably fastened to an upper-side of said right-side piston bank;
        wherein said right-side fuel feed distributes a second measured combustible air-fuel mixture into at least one right-side piston cylinder such that said second measured combustible air-fuel mixture is compressed and explosion-ignited to rotationally drive said right-side crankshaft;
        wherein said second measured combustible air-fuel mixture comprises natural gas;
        wherein said vehicle comprises an activator to change a mode from using said first measured combustible air-fuel mixture to said second measured combustible air-fuel mixture;
        wherein said activator is able to change from using said second measured combustible air-fuel mixture back to said first measured combustible air-fuel mixture;
        wherein said motor-engaging-end of said engine bank selector box is coupled to a back side of said engine block such that a user is able to select a left-side piston bank and alternately a right-side piston bank, via said selector control, to power a drive train;
    and wherein said engine assembly is usable by said user to selectively and rotationally drive said drive train of a vehicle using said left-side piston bank with said first measured combustible air-fuel mixture, and to selectively and alternately rotationally drive said drive train of said vehicle using said right-side piston bank with said second measured combustible air-fuel mixture, such that said user is able to reduce an operation cost of said vehicle by selecting an available and a lower cost fuel type.

* * * * *